(12) United States Patent
Stelter

(10) Patent No.: US 7,722,685 B2
(45) Date of Patent: May 25, 2010

(54) PROCESS AND DEVICE FOR PRODUCING A FUEL CELL STACK WHILE APPLYING A CONTROLLED FORCE TO THE ASSEMBLED STACK

(75) Inventor: Michael Stelter, Chemnitz (DE)

(73) Assignee: Staxera GmbH, Dresden (DE)

(*) Notice: Subject to any disclaimer, the term of this patent is extended or adjusted under 35 U.S.C. 154(b) by 565 days.

(21) Appl. No.: 10/565,805

(22) PCT Filed: Jul. 23, 2004

(86) PCT No.: PCT/DE2004/001641

§ 371 (c)(1),
(2), (4) Date: Jan. 25, 2006

(87) PCT Pub. No.: WO2005/013390

PCT Pub. Date: Feb. 10, 2005

(65) Prior Publication Data

US 2007/0277367 A1  Dec. 6, 2007

(30) Foreign Application Priority Data

Jul. 25, 2003 (DE) .................. 103 34 129

(51) Int. Cl.
*H01M 4/82* (2006.01)
*H01M 10/14* (2006.01)

(52) U.S. Cl. .................. 29/623.3; 29/623.2; 29/730

(58) Field of Classification Search .................. 429/34, 429/35, 36, 37, 38, 39; 29/623.3, 730, 623.2
See application file for complete search history.

(56) References Cited

U.S. PATENT DOCUMENTS

| | | | |
|---|---|---|---|
| 4,430,179 A | 2/1984 | Ford et al. | |
| 4,615,107 A | 10/1986 | Kumeta et al. | |
| 5,501,914 A | 3/1996 | Satake et al. | |
| 6,190,793 B1* | 2/2001 | Barton et al. | 429/34 |
| 6,533,827 B1* | 3/2003 | Cisar et al. | 29/623.4 |
| 7,318,874 B2 | 1/2008 | Roosen et al. | |
| 2002/0034673 A1* | 3/2002 | Bisaka et al. | 429/37 |
| 2003/0041444 A1* | 3/2003 | Debe et al. | 29/623.1 |
| 2003/0190226 A1* | 10/2003 | Eaton et al. | 414/796.4 |
| 2003/0203269 A1* | 10/2003 | Rock | 429/37 |
| 2004/0081864 A1* | 4/2004 | Herrmann | 429/13 |

FOREIGN PATENT DOCUMENTS

| | | |
|---|---|---|
| DE | 43 07 967 A1 | 9/1994 |
| JP | 59-138075 A | 8/1984 |
| JP | 11-7975 A | 1/1999 |
| JP | 11007975 A * | 1/1999 |
| WO | 02/09216 A2 | 1/2002 |
| WO | WO02/09216 A2 * | 1/2002 |

* cited by examiner

*Primary Examiner*—Patrick Ryan
*Assistant Examiner*—Muhammad Siddiquee
(74) *Attorney, Agent, or Firm*—David S. Safran; Roberts Mlotkowski Safran & Cole, P.C.

(57) ABSTRACT

A method for the production of a fuel cell stack, involving the following steps: a) piling up the fuel cell stack (1) and (b) putting together the fuel cell stack (1) while heating and compressing the piled fuel cell stack (1). At least one regulated force is applied to the piled fuel cell stack (1) during the compression thereof.

13 Claims, 4 Drawing Sheets

PROCESS AND DEVICE FOR PRODUCING A FUEL CELL STACK WHILE APPLYING A CONTROLLED FORCE TO THE ASSEMBLED STACK

BACKGROUND OF THE INVENTION

1. Field of the Invention

The invention relates to a process for producing a fuel cell stack by stacking the fuel cells into a stack, and joining the fuel cell stack as the assembled fuel cell stack is heated and compressed.

Furthermore, the invention relates to a device for producing a fuel cell stack, especially a device for carrying out the process of the invention, with a heating means for heating the assembled fuel cell stack, and a means for compressing the assembled fuel cell stack.

2. Description of Related Art

For example, known SOFC fuel cell stacks (SOFC="solid oxide fuel cell") generally comprise several fuel cell elements with seals located between the fuel cell elements and a pair of end plates and current collector plates. These fuel cell stacks are produced by known production processes, for example, as follows. First of all, the fuel cells are stacked into a stack cold. In doing so, the anode sides of the fuel cells are still in the unreduced state (for example, NiO instead of Ni). Compressible seals are still uncompressed and glass seals, such as, for example, glass paste or glass solder, are still unmelted, i.e., green. In the known production processes, the assembled fuel cell stack is then heated in a furnace until the glass paste or the glass solder melts. Here, the fuel cell stack is compressed under a mechanical load so that the seals melt and seal. At the same time or subsequently, a reducing gas is delivered into the anode space of the fuel cell stack, for example, hydrogen, by which the anode is reduced, for example, from NiO to Ni. Optionally, the mechanical load continues during the reduction process, i.e., further compression of the fuel cell stack takes place in order to compensate for the reduction in the thickness of the fuel cells during shrinkage.

For example, U.S. Pat. No. 4,615,107 discloses one possibility for compression of an assembled fuel cell stack.

One problem in the known processes and devices for producing fuel cell stacks is that the joining of the fuel cell stack takes placed uncontrolled and without the possibility of being able to intervene in the process, for which reason scrap rates are high. Furthermore, for example, the fuel cell stack can only be checked for gas-tightness after completion of the joining process.

SUMMARY OF THE INVENTION

The object of the invention is to develop the generic processes and devices such that the high scrap rates which had to be tolerated in the past in the production of fuel cell stacks are reduced, and thus, costs are cut.

This object is achieved by the features of the invention.

The process in accordance with the invention is based on generic prior art in that compression of the assembled fuel cell stack encompasses application of at least one controlled force component to the assembled fuel cell stack. Controlling of the force that produces the compression has the advantage that is possible to intervene into the production process during the joining process depending on the joining results achieved at the instant (automatically). For example, the force causing compression of the fuel cell stack can be increased until tightness of the fuel cell stack can be assumed with high probability using the current joining result or it has been demonstrated using measurement technology.

In preferred embodiments of the process of the invention, it is provided that the control of at least one force component includes the bracing of the assembled fuel cell stack which has been detected by way of at least one force sensor. The force sensor or sensors can, for example, be provided between the assembled fuel cell stack and a contact surface against which the fuel cell stack is pressed by the controlled force component.

It can be provided additionally or alternatively that the change of the dimensions of the assembled fuel cell stack which has been detected by way of at least one distance sensor is included in the controlling of at least one force component. The changes of the dimensions of the fuel cell stack in many cases indicate the joining result which has been attained. Alternatively, it is possible to use of one or more distance sensors, and also other sensors which are suitable for detecting the dimensions of the fuel cell stack, for example, optical sensors.

One likewise preferred development of the process in accordance with the invention calls for at least one controlled force component to be produced by a compression and/or tension means and for it to be transmitted by way of at least one tie rod to the assembled fuel cell stack. In doing so, the compression and/or tension means can produce the controlled force component in different ways which are familiar to one skilled in the art, for example, hydraulically, pneumatically or electrically. If at least one controlled force component is produced by tension, the use of at least one tie rod is advantageous. This applies especially when it is provided that the at least one tie rod is intended to maintain the bracing of the fuel cell stack even after completion of the production process.

In this connection, it is considered to be especially advantageous that at least one tie rod extends through a recess provided in the assembled fuel cell stack. In particular, when the recess is located centrally in the fuel cell stack, the use of only one tie rod for compression of the fuel cell stack in the joining process and for maintaining the bracing of the fuel cell stack after the production process is sufficient in many cases.

The process according to the invention can be advantageously developed by checking the already at least partially joined fuel cell stack for gastightness. In this connection, it is especially preferred if checking for gas-tightness takes place during joining, i.e., at the instant at which the fuel cell stack can optionally be further compressed if the required gas-tightness is not yet ensured.

In this connection, it is preferred that the checking step is performed by the fuel cell stack being flooded with a gas, preferably with an inert test gas, and that possible leaks of the fuel cell stack are detected by way of a drop in the gas pressure.

In this connection, one preferred development of the process of the invention calls for the fuel cell stack to be further heated in the case of detected leakage of it and/or for the fuel cell stack to be further compressed. In this case, further compression also takes place in a preferably controlled manner, and the pressure loss can be included in the control additionally or alternatively.

For the process as in accordance with the invention, it is likewise preferred that a chemical forming step is carried out in which a reducing gas, especially a reducing gas mixture such as hydrogen and nitrogen, is added to the fuel cells of the fuel cell stack. It is advantageous to continue to monitor the tightness of the fuel cell stack even during the forming process, for example, by escape of the reducing gas being detected in order to be able to take suitable countermeasures at this instant of the production process. They can consist, for example, in further controlled compression of the fuel cell stack. Therefore, it is likewise advantageous to further monitor the bracing of the fuel cell stack.

For the process of the invention, it is furthermore considered to be advantageous if it is provided that the change in the volume of the fuel cell stack caused by the chemical forming step that is at least partially balanced by corresponding compression of the fuel cell stack. In this connection, compression takes place preferably controlled in the sense of the invention.

For the process in accordance with the invention, it is likewise preferred that, after the chemical forming step, the electrical serviceability of the fuel cell stack is tested. In this way, the quality of the fuel cell stack which has been produced can be determined in a comparatively simple manner.

Here, it is preferred that execution of the testing step comprises the fact that the anode side of the fuel cell stack is supplied with a combustible gas and the cathode side of the fuel cell stack is supplied with a cathode gas and that the voltage which forms in the fuel cell stack and/or a current which can be taken from the fuel cell stack is/are measured. Here, it is advantageous if testing of the electrical serviceability of the fuel cell stack is only carried out when the fuel cell stack is still tight after forming.

One preferred embodiment of the process according to the invention, already mentioned above, comprises the additional step of connecting at least one tie rod to at least one locking element which at least roughly maintains the bracing of the fuel cell stack even when at least one tie rod is loosened from the compression and/or tension means. For example, when the tie rod is formed at least partially by a threaded rod, the locking element can be easily formed by a nut.

Special advantages compared to known production processes arise when at least the joining and chemical forming process steps, and preferably also the inert test gas flooding and testing steps, are carried out in a gastight process chamber, preferably without opening the process chamber in the interim. The process chamber can be a stationary one or a process chamber which is moved back and forth between two treatment stations during the production process.

The device of the invention is based on the generic prior art in that the means for compressing the assembled fuel cell stack comprises a compression and/or tension means which is suited to applying at least one controlled force component to the assembled fuel cell stack. This approach makes it possible, just like the process of the invention, to suitably vary the compression of the fuel cell stack during its production until the fuel cell stack has the desired properties. In this way, it is especially possible to clearly reduce the previously tolerated high scrap rates. With the device in accordance with the invention the advantages achieved with the process of the invention are implemented in the same or similar manner, for which reason to prevent repetitions, reference is made to the corresponding statements in conjunction with the process of the invention.

The same applies analogously to the following preferred embodiments of the device in accordance with the invention, reference also being made in this respect to the corresponding statements in conjunction with the embodiments of the process of the invention.

In preferred embodiments of the device according to the invention, it is provided that a control means is assigned to the compression and/or tension means for controlling at least one force component and that it controls at least one force component depending on the bracing of the assembled fuel cell stack which has been detected by way of at least one force sensor and/or as a function of the change of the dimension of the assembled fuel cell stack which is detected by way of at least one distance sensor.

Here, it is furthermore preferred that the compression and/or tension means is suited to transmitting at least one controlled force component by way of a tie rod to the assembled fuel cell stack.

Preferred embodiments of the device in accordance with the invention furthermore call for its having a gastight process chamber which is provided for holding the assembled fuel cell stack and a gas supply means which is intended for flooding the process chamber and/or the fuel cell stack which is located in the process chamber with gas.

One advantageous development of the device of the invention calls for it to have a gas exhaust means.

The device of the invention is furthermore advantageously developed in that it has an electrical test means.

In order to ensure a continuous assembly process, the device in accordance with the invention can be made such that it has a plurality of movable, gastight process chambers which are designed to be moved to different treatment stations for carrying out individual fuel cell stack production steps.

In this connection, it is especially preferred that the plurality of gastight process chambers is arranged in the form of a carousel. Here, in particular, embodiments are conceivable in which the assembly or process chambers are located on the arms of the carousel. In this case, gas supply or exhaust lines as well as electrical lines can be advantageously located in the hub of the carousel and can extend in a star shape to the individual process chambers. If the carousel is located in a certain position, a process chamber is opened and a fuel cell stack is assembled in the process chamber or an already assembled fuel cell stack is placed in the process chamber. Then, the process chamber is closed again and the carousel is set into motion. Thus, all steps for joining and testing can proceed during the time which the carousel requires for one revolution. In this case, the finished fuel cell stack can be removed at the same position at which it was placed cold.

It follows from the aforementioned that one important aspect of this invention consists in that by a controlled joining process the high scrap rates which had been tolerated in the known production processes can be distinctly reduced.

The invention is explained below by way of example with reference to the attached drawings which show preferred embodiments.

DETAILED DESCRIPTION OF THE INVENTION

Figure 1:
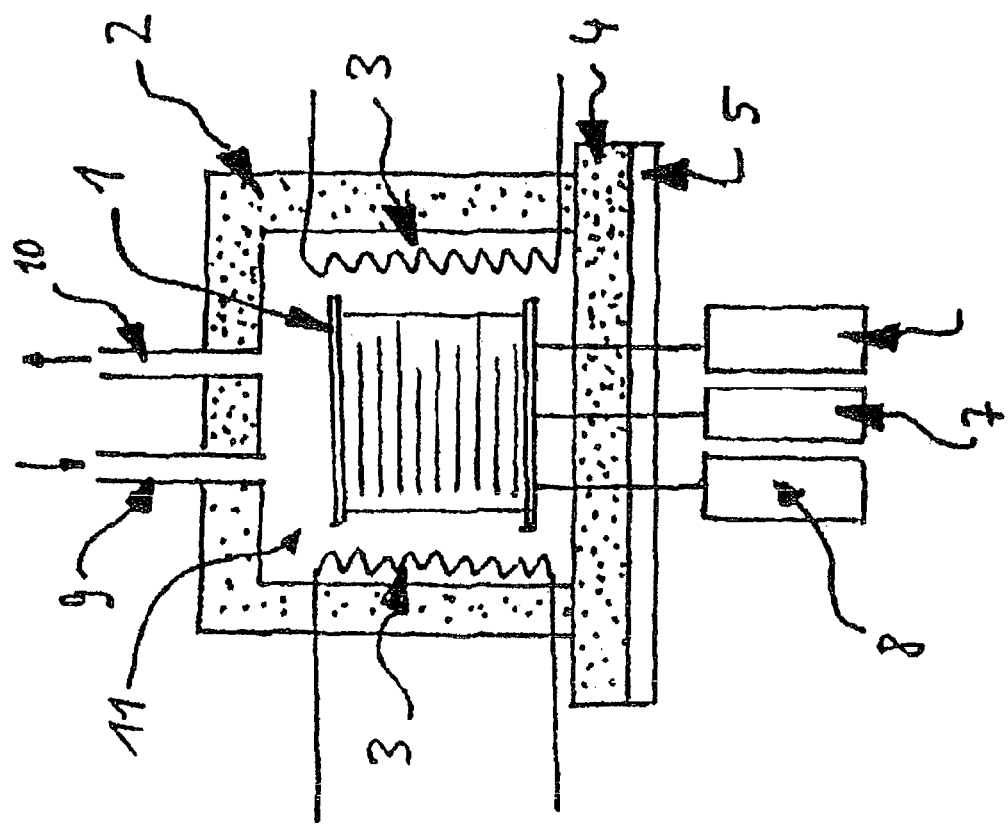
FIG. 1 is a simplified schematic block diagram of one embodiment of the device in accordance with the invention which is suited for carrying out the process of the invention.

FIG. 1 shows a gastight process chamber 11 which is formed essentially by a table 5 and a gastight hood 2 which is placed on it. In the process chamber 11, a fuel cell stack 1 is assembled. Between the table 5 and the assembled fuel cell stack 1, there is an insulating plate 4 through which lines and other connecting means extend with sealing, which lines and means connect the process chamber 11 or the fuel cell stack 1 which is located in it to a means 6 for electrical monitoring of the fuel cell stack 1, a means 7 for gas supply and exhaust and a means 8 for mechanical tensioning and monitoring of the fuel cell stack 1. In the upper area of the gastight hood 2, there are (another) gas supply 9 and (another) gas exhaust 10, and this (other) gas supply 9 and (other) gas exhaust 10 can optionally be assigned to the means 7 for gas supply and exhaust. In the process chamber 11, there are also heating elements 3 with which the process chamber 11 or a fuel cell stack 1 located in it can be heated.

The device shown in FIG. 1 is explained below using FIGS. 2 to 4 in which individual components of the device shown in FIG. 1 are explained.

Figure 2:
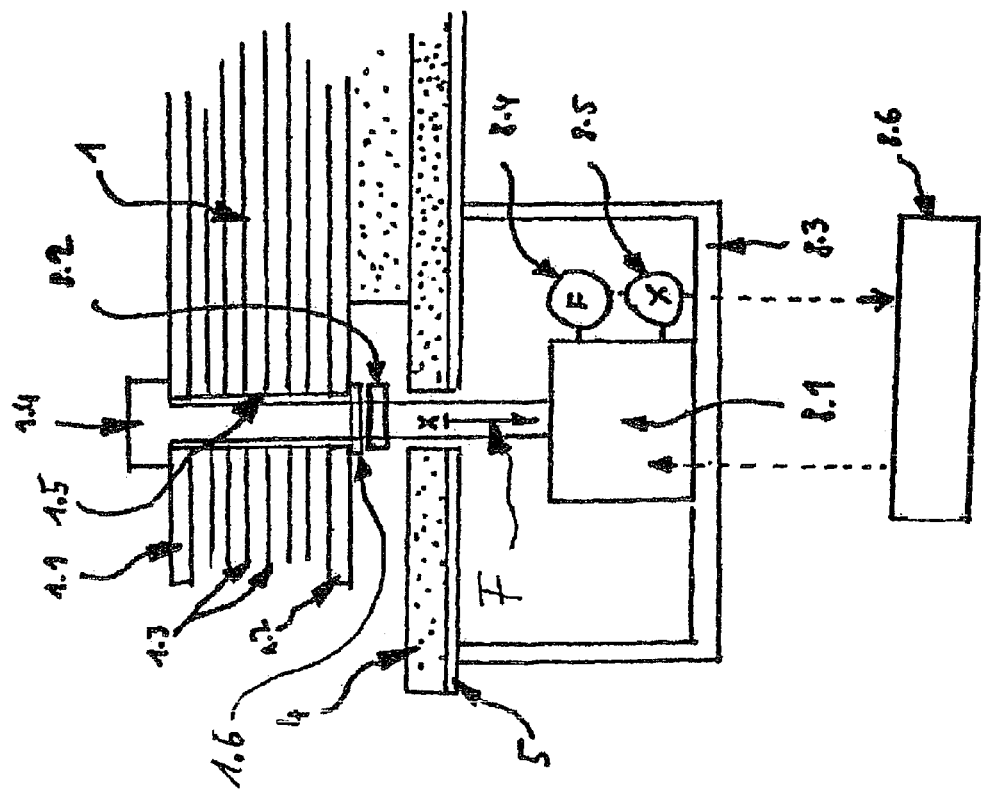
FIG. 2 is a simplified schematic block diagram of a means for mechanical tensioning and monitoring of the fuel cell stack, this means being a component of the device from FIG. 1.

FIG. 2 shows a simplified schematic block diagram of a means for mechanical tensioning and monitoring of the fuel cell stack, this means being a component of the device from FIG. 1. In FIG. 2, the fuel cell stack 1 which is located on the table 5 or the insulating plate 4 is shown only in part. The fuel cell stack 1 comprises a lower base plate 1.2 and an upper cover plate 1.1. Between the lower base plate 1.2 and the upper cover plate 1.1 there are the individual fuel cells 1.3. The fuel cell stack 1 comprises a recess 1.5 through which, in the illustrated case, a tie rod 1.4 extends and which, in the completely installed state, assumes or maintains the bracing of the fuel cell stack 1. For this purpose there is a locking element 1.6 which can comprise, for example, a nut when the tie rod 1.4, at least in its lower section, is formed by a threaded rod. The tie rod 1.4 is detachably connected to the tension means 8.1 via a coupling element 8.2. The tie rod 1.4 is positively connected to the table 5 by way of a carrier frame 8.3 and is designed to exert a controlled force component F on the tie rod 1.4, and thus, the fuel cell stack 1 in a direction x. In this way, the fuel cell stack 1 is more or less braced. The tension means 8.1 can produce the controlled force component F, for example, hydraulically, pneumatically or electrically.

The tension means 8.1 is supplied with a manipulated variable for the tensile force to be produced by a control means 8.6. The control means 8.6 produces the manipulated variable, in the illustrated embodiment, depending on one or more forces detected by way of at least one force sensor 8.4 and a change of the dimensions of the fuel cell stack 1 which has been detected by way of at least one path sensor 8.5.

Figure 3:
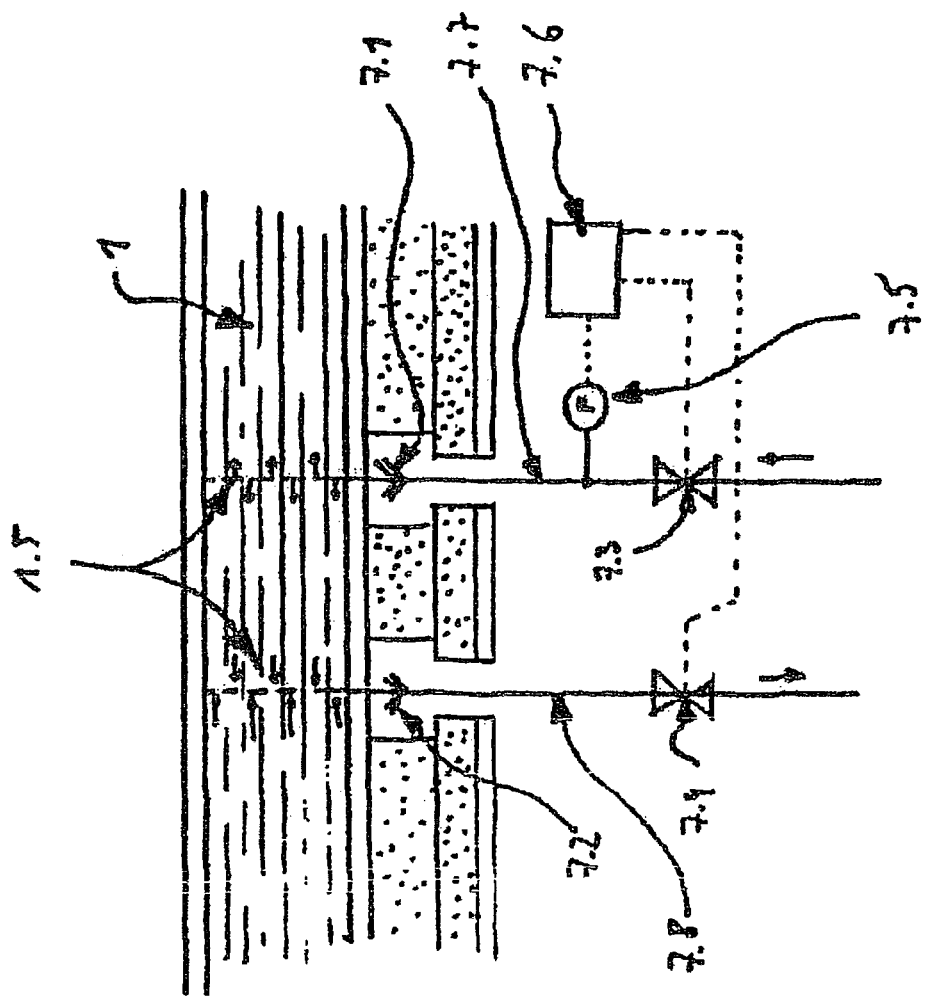
FIG. 3 is a simplified schematic block diagram of a means for gas supply and exhaust, this means being a component of the device from FIG. 1.

FIG. 3 shows a simplified schematic block diagram of a means for gas supply and exhaust, this means being a component of the device from FIG. 1. As shown in FIG. 3, the fuel cell stack 1 comprises internal channels 1.5 for routing a gas, especially for routing an anode gas, which each have at least one side which is open to the outside. The fuel cell stack 1 can, moreover, have other internal channels for routing the cathode gas (not shown). In addition or alternatively, the cathode sides of the fuel cells can be open to the outside. The internal distribution channels 1.5 discharge into detachable pipe connections 7.1 for the anode gas supply line 7.7 and detachable pipe connections 7.2 for the anode gas exhaust line 7.8. A valve 7.3 is assigned to the anode gas supply, while a valve 7.4 is assigned to the anode gas exhaust. Between at least one detachable pipe connection, for example, the detachable pipe connection 7.1, and the respective stop valve, for example, the stop valve 7.3, there is a pressure measuring means 7.5 which is connected to a gas control device 7.6. If the fuel cell stack 1 does not have internal distribution channels for the anode gas, they can also be connected to an external cathode gas supply or exhaust via detachable pipe connections. To control the anode gas routing, there can be other valves and pressure sensors (not shown). The gas control device 7.6 is designed to open and close the existing valves, especially the illustrated valves 7.3, 7.4.

Figure 4:
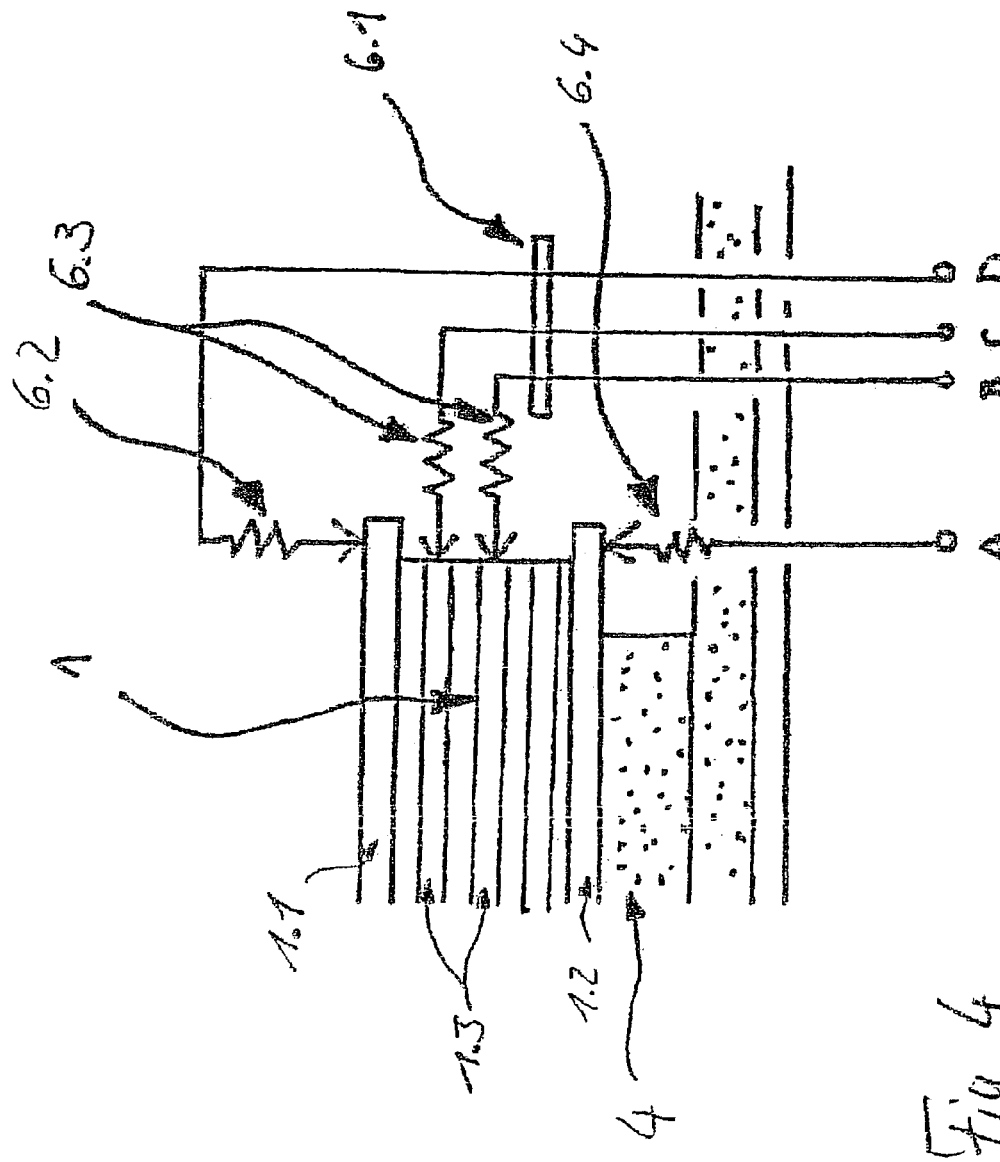
FIG. 4 is a simplified schematic block diagram of a means for electrical monitoring of the fuel cell stack, this means being a component of the device from FIG. 1.

FIG. 4 shows a simplified schematic block diagram of a means for electrical monitoring of a fuel cell stack, this means being a component of the device from FIG. 1. FIG. 4 shows the edge area of a fuel cell stack 1 which is located on the insulating plate 4. The cover plate 1.1 is connected to a terminal D via an electrical contact element 6.2. Similarly, the base plate 1.2 is connected to a terminal A by way of a contact element 6.4. Furthermore, in the illustrated case the individual cells 1.3 are connected to the terminals B and C by way of the contact element 6.3. The contact elements 6.2, 6.3 and 6.4 can optionally be mechanically supported by one or more holders 6.1. Although it would be sufficient in the simplest case to connect only one individual cell to a contact element, it is preferred that at least two individual cells 1.3 be electrically tapped. To check the serviceability of the fuel cell stack 1, voltages and/or currents can be tapped on the terminals A to D. The contact elements 6.2, 6.3 and 6.4 consist preferably of a heat-resistant alloy. Furthermore, they are preferably made elastic in order to always maintain electrical contact with minimum movements of the fuel cell stack 1 during the production process.

How the components of the device from FIG. 1 which are shown in FIGS. 2 to 4 work and one possibility for executing the process of the invention are explained below.

Assembling the Fuel Cell Stack

First, the fuel cells are stacked into a stack cold, i.e., the individuals cells 1.3 which are in the unreduced state and the base plate 1.2 and the cover plate 1.1 are stacked up, glass solder being applied as a paste or being stacked up at the same time as a film. Then, the assembled fuel cell stack 1 is placed on the insulating plate 4. Although the invention is not limited to these embodiments, in this case only, one tie rod 1.4 is joined to the pertinent coupling piece 8.2 of the tension means 8.1 (FIG. 2). Then, the detachable gastight connections 7.1, 7.2 are established, the valves 7.3, 7.4 first being closed (FIG. 3). Furthermore, the electrical contacts 6.2, 6.3, 6.4 are put in place (FIG. 4). Then, the hood 2 is closed (FIG. 1). By way of the gas supply 9, the process chamber 11 can be flooded with an inert gas, and gas cycling [that is to say, alternately supply and exhausting of gas] can be carried out via the gas exhaust 10. When the optionally preheated heating elements 3 are turned on, the process chamber 11, and thus the assembled fuel cell stack 1 located in it, are heated. In this way, the glass solder begins to melt. At this point, the tension means 8.1 is activated, by which it begins to compress the assembled fuel cell stack 1, and thus, to brace it. In this way, the decrease of the length of the fuel cell stack 1 caused by shrinkage of the glass solder is at least for the most part balanced. By way of the force sensor 8.4 and the path sensor 8.5, the force-path curve of the bracing of the fuel cell stack 1 is detected. In the embodiments in which there are several tie rods, this takes place preferably for each tie rod. The force-path curve is compared to one or more predefined theoretical curves. If deviations should arise, this indicates nonuniform bracing of the fuel cell stack 1. In this case, suitable countermeasures can be initiated. For example, the force component produced by at least one tension means can be increased or decreased. Although this is not shown, it is considered to be advantageous to provide several tie rods, and optionally, several tension means because in this case nonuniform bracing of the fuel cell stack 1 can be especially effectively counteracted.

Checking the Fuel Cell Stack for Tightness

When a state is reached in which the glass seals have been melted to such a degree that gas-tightness of the fuel cell stack 1 can be assumed, the fuel cell stack 1 is flooded with an inert test gas by opening the valves 7.3, 7.4 (FIG. 3). Gas is supplied until a certain pressure is reached. Then, the valves 7.3, 7.4 are closed. Optionally, the test gas can be preheated in order to reduce the temperature shock in the fuel cell stack. The pressure in the fuel cell stack 1 is detected by way of the pressure sensor 7.5 and is evaluated in the gas control device 7.6. If the pressure drop which has been detected over a given time interval exceeds a boundary value, a leaky fuel cell stack is deduced. In addition or alternatively to the detection of the pressure drop, a test gas can be used which overflows into the process chamber 11 when there is a leak. By way of the gas exhaust 10, traces of the test gas can be exhausted and quantitatively detected by way of a gas sensor (not shown). The degree of the pressure drop or the amount of the test gas which has emerged is a measure of the tightness of the fuel cell stack 1. If a leak has been detected, countermeasures can still be taken in the process. For example, pressing can be made stronger, a longer time for melting of the seals can be selected and/or the temperature can be raised. If the desired properties of the fuel cell stack 1 cannot be attained in spite of initiating countermeasures, the process can be stopped if necessary. If there are internal channels for routing the cathode gas in the fuel cell stack 1, testing of the fuel cell stack 1 for tightness can take place analogously.

Forming the Fuel Cell Stack

If the tightness criteria have been satisfied, in the next step, chemical forming of the fuel cells can take place, i.e., reduction. For this purpose, the mechanical bracing of the fuel cell stack 1 is further monitored (FIG. 2), by way of the valves 7.3, 7.4 (FIG. 3); however, only one preferably continuous flow of a reducing gas, preferably of a reducing gas mixture, such as hydrogen and nitrogen, is routed through the tight fuel cell stack 1. The forming gas can optionally be preheated in order to avoid temperature shocks in the fuel cell stack 1. Especially when the forming gas is flammable or explosive must escape of the forming gas from the process chamber 11 be reliably prevented. For this purpose, in the process chamber 11, a negative pressure can be maintained by way of gas cycling 9, 10. This leads to the hydrogen gas which emerges during forming in case of a possible leak of the fuel cell stack 1 being immediately burned by the air entering the process chamber 11. Additionally or alternatively, in the process chamber 11, continuous gas exchange can be ensured by way of cycling 9, 10 in order to remove escaping forming gas from the process chamber 11. Traces of escaped forming gas can optionally be measured with a sensor downstream of the gas exhaust 10. These traces of escaped forming gas are a measure of possible leakiness of the fuel cell stack 1 during the process. If a leak is detected, suitable countermeasures can always be initiated. During forming, the microstructure of the fuel cells changes. This is accompanied by a change in the volume. This change in volume can at least, for the most part, be balanced by the control of at least one force component F (FIG. 2) during pressing.

Checking the Fuel Cell Stack for Electrical Serviceability

If the fuel cell stack 1 is still tight after forming and all fuel cells are reduced, the fuel cell stack 1 is electrically ready for operation. The fuel cell stack 1 is now flooded with a hydrogen-containing combustible gas by way of valves 7.3, 7.4 (FIG. 3). The process chamber 11 is flooded with a cathode gas by way of the gas cycling 9, 10, for example with air. If the routing of the cathode gas takes place via internal channels, they are used to fill the fuel cell stack 1 with cathode gas. By supplying a combustible gas to the anode side of the fuel cell stack 1 and a cathode gas to the cathode side of the fuel cell stack 1, an electrical voltage is formed in the fuel cell stack 1. The voltage can be tapped by way of the contact elements 6.2, 6.4 and can be measured on the terminals A, D. The voltage difference between a certain number of individual cells 1.3 which can be tapped by way of the contact elements 6.3 and can be measured on the terminals B, C is a measure of the quality of the individual cells 1.3 which are located between the contact elements 6.3.

In preferred embodiments, each individual fuel cell is measured since it is a quality criterion that all individual cells deviate no more than a given amount from a given voltage. Optionally, at least the contact elements 6.2, 6.4 are made such that they can route higher currents than pure voltage taps. To test the fuel cell stack 1, a current can be removed from the fuel cell stack 1 by way of the contact elements 6.2, 6.4. In doing so, the voltage between the contact elements 6.2, 6.4 and between each of the contract elements 6.3 decreases. A test criterion can consist in that the course of the decrease of the voltage when the current increases deviates from a predefined course by no more than a certain amount.

Removing the Fuel Cell Stack

While the tie rod 1.4 is under mechanical stress due to the tension means 8.1, on the fuel cell stack side in front of the coupling element 8.2, a locking element 1.6 is attached (FIG. 2) which also maintains the tensile stress in the tie rod 1.4 when the coupling element 8.2 is opened and the tension means 8.1 is separated from the fuel cell stack 1. Preferably, the tie rod 1.4 and the locking element 1.6 remain on the fuel cell stack 1. It is therefore considered to be advantageous if the locking element 1.6 sits loosely pre-mounted on the tie rod 1.4 before heating of the fuel cell stack 1 and only after successful bracing of the fuel cell stack 1 is tightened or locked. In a suitable execution of the bushing of the coupling element 8.2, the tightening or locking of the locking element 1.6 can take place from the cold side of the base plate 5.

Incorporation into the Production Process

The above explained steps can be carried out in an individual, free standing process chamber 11 which is used as an assembly and test chamber.

However, it is preferred if several process chambers are integrated into a means for continuous installation. Such a means for continuous installation can be formed, for example, by a carousel with process chambers 11 located on each of its arms. Preferably, the gas supply and exhaust lines and the electrical feeds are located in the hub of the carousel and extend in the shape of a star to the process chambers 11. When the carousel is located in a certain position, a hood 2 can be opened and the assembled fuel cell stack 1 can be installed cold. Then, the hood 2 is closed and the carousel continues to turn. All steps for joining and testing then run preferably in the time which the carousel requires for one rotation. When the carousel is again in the initial position, a finished fuel cell stack 1 can be removed and another cold assembled fuel cell stack 1 can be put in place.

Compared to the prior art, the invention makes it possible to greatly reduce the scrap amounts which occur in the production of fuel cell stacks and to increase the quality of the fuel cell stack.

The features of the invention which were disclosed in the aforementioned description and in the drawings can be important to implementing the invention both individually and also in any combination.

The invention claimed is:

1. Process for producing a fuel cell stack with the following steps:
   a) stacking the fuel cells into an assembled fuel cell stack (1), and
   b) joining the fuel cell stack (1) as the assembled fuel cell stack (1) is heated and compressed,
   wherein compression of the assembled fuel cell stack is performed by application of at least one controlled force component (F) to the assembled fuel cell stack (1),
   wherein the application of the at least one controlled force component (F) is performed based upon a change of the dimensions of the assembled fuel cell stack (1) detected with at least one distance sensor,
   wherein a detected force-path curve of a bracing of the fuel cell stack (1) is compared to at least one predefined theoretical curve, and
   wherein, when the comparison indicates that the detected force-path curve has deviated from the at least one predefined theoretical curve, said at least one force component (F) is increased or decreased so as to counter the deviation.

2. Process as claimed in claim 1, wherein at least one controlled force component is produced by at least one of a compression and a tension means (8.1) and is transmitted to the assembled fuel cell stack (1).

3. Process as claimed in claim 2, wherein at least one of a compression and a tension means is connected to at least one tie rod (8.1) that extends through a recess (1.5) provided in the assembled fuel cell stack (1) and which transmits the at least one controlled force component to the assembled fuel cell stack.

4. Process as claimed in claim 1, comprising the further step of checking the already at least partially joined fuel cell stack (1) for gas-tightness at least one of during and after said joining step.

5. Process as claimed in claim 4, wherein said checking step comprises flooding the fuel cell stack (1) with a gas, and detecting possible leaks of the fuel cell stack (1) by way of a drop in gas pressure.

6. Process as claimed in claim 5, wherein, in the case of detected leakage of the fuel cell stack (1), the fuel cell stack (1) is at least one of further heated and further compressed.

7. Process as claimed in claim 1, comprising the further step, which is carried out at least one of during and after said joining step, of chemical forming of the fuel cells (1.3) of the fuel cell stack (1) by adding a reducing gas, to the fuel cells (1.3) of the fuel cell stack (1).

8. Process as claimed in claim 7, wherein a change in the volume of the fuel cell stack (1) caused by said chemical forming step is at least partially balanced by corresponding compression of the fuel cell stack (1).

9. Process as claimed in claim 7, wherein following the chemical forming step testing of the electrical serviceability of the fuel cell stack (1) is performed.

10. Process as claimed in claim 9, wherein the testing step comprises supplying an anode side of the fuel cell stack with a combustible gas and a cathode side of the fuel cell stack with a cathode gas, and measuring at least one of a voltage which forms in the fuel cell stack and a current which can be taken from the fuel cell stack.

11. Process as claimed in claim 3, comprising the further step of connecting the at least one tie rod (1.4) to at least one locking element (1.6) which at least roughly maintains the bracing of the fuel cell stack (1) even when at least one tie rod (1.4) is loosened from the at least one of a compression and a tension means.

12. Process as claimed in claim 7, wherein at least the joining and chemical forming steps are carried out in a gastight process chamber.

13. Method according to claim 1, wherein increasing of the at least one force component is stopped when at least one of a predetermined tightness or close contact of the cells of the fuel cell stack is determined to have been achieved.

* * * * *